United States Patent [19]

Iapicco

[11] 4,416,016

[45] Nov. 15, 1983

[54] DIFFERENTIAL PHASE SHIFT KEYED RECEIVER

[75] Inventor: Jeffrey A. Iapicco, Little Ferry, N.J.

[73] Assignee: Bell Telephone Laboratories, Incorporated, Murray Hill, N.J.

[21] Appl. No.: 272,480

[22] Filed: Jun. 11, 1981

[51] Int. Cl.³ .......................................... H04L 27/22
[52] U.S. Cl. .................................... 375/85; 329/137; 329/145
[58] Field of Search ................................. 375/83–85, 375/15, 110, 54; 364/817; 358/28; 329/110, 137, 145

[56] References Cited

U.S. PATENT DOCUMENTS

| | | | |
|---|---|---|---|
| 3,238,459 | 3/1966 | Landee | 375/85 |
| 3,665,328 | 5/1972 | Widl | 329/110 |
| 3,818,346 | 6/1974 | Fletcher et al. | 375/85 |
| 4,343,018 | 8/1982 | Niimura et al. | 358/28 |

*Primary Examiner*—Marc E. Bookbinder
*Assistant Examiner*—Albert W. Watkins
*Attorney, Agent, or Firm*—M. A. Morra

[57] ABSTRACT

A Differential Phase Shift Keyed (DPSK) receiver is arranged to detect DPSK signals that contain the 0° vector as an information bearing signal in its constellation. The received signal is phase shifted by 90°. A 45° phase shifted signal is thereafter synthesized by additively combining the DPSK signal and the 90° phase shifted signal. Using these signals, detection proceeds by means of correlation techniques. The polarities of the correlation products uniquely determine the phase changes of the DPSK signal.

8 Claims, 5 Drawing Figures

DIFFERENTIAL PHASE SHIFT KEYED RECEIVER

FIELD OF THE INVENTION

This invention relates to data communication systems and more particularly to receivers for differentially phase modulated signals.

BACKGROUND OF THE INVENTION

Differential Phase Shift Keyed (DPSK) modulation is used extensively in binary digital data communications. Data are transmitted by periodically shifting the phase of a constant frequency carrier wave. Information is encoded as the phase difference (shift) between adjacent baud intervals and it is possible to have a particular phase shift represent more than one binary digit (bit). For example, the following bit pairs might be represented by the tabulated phase shifts.

| BIT PAIR | PHASE | SHIFT |
|---|---|---|
| 11 | +45° | 0° |
| 10 | −45° | 90° |
| 00 | +135° | 180° |
| 01 | −135° | −90° |

Each particular set of phase shifts (e.g., 0°, ±90°, 180°) is called a constellation while the individual phase shifts are referred to as vectors. The above table illustrates two possible constellations for use in a 4-phase DPSK system.

DPSK receivers utilize a reference frequency available in a plurality of phase states equal in number to one-half the number of transmitted phase states. The reference phase states are selected to reside midway between certain adjacent transmitted states. When the transmitted constellation is, for example, (±45°, ±135°) the only additional reference phase that needs to be generated is a 90° vector (a 0° vector is already available as the incoming signal itself). Such a system is described in U.S. Pat. No. 3,128,343, issued to P. A. Baker on Apr. 7, 1964.

However, when the transmitted constellation is (0°, ±90°, 180°) the use of the 0° and 90° reference phases do not yield to polarity detection alone. It is therefore an object of this invention to avoid magnitude measurements in the demodulation of DPSK signals.

When the transmitted constellation is (0°, ±90°, 180°) reference phases of ±45° are a natural choice for multiplication with the incoming signal to achieve demodulation. Indeed, a choice such as this is indicated at page 205 in the book *Data Transmission,* by Bennett, W. R., and Davey, J. R., copyright 1965, McGraw-Hill, Inc. A pair of phase shifting networks is therefore needed to achieve demodulation. Although polarity detection is sufficient for demodulation of the DPSK signal, the use of multiple phase shift networks is both costly and cumbersome.

Accordingly, it is another object of this invention to minimize the number of phase shifting networks used in generating the reference signals for DPSK detectors.

SUMMARY OF THE INVENTION

In accordance with the objects of this invention, detection of a Differential Phase Shift Keyed (DPSK) signal containing the 0° vector as an information bearing signal in the constellation, includes the correlation of the incoming DPSK signal with at least one reference signal generated by additively combining pairs of signals derived from the incoming DPSI signal and a 90° phase shifted version of the incoming DPSK signal.

In one embodiment of the invention a 4-phase DPSK signal is detected by correlating the incoming signal with a 45° reference signal and correlating the 90° phase shifted signal with the same reference. The polarity of the correlation products uniquely determine the phase shifts of the incoming DPSK signals.

In another embodiment of the invention, detection of an 8-phase DPSK signal includes correlating the incoming DPSK signal with ±22½° and ±67½° reference signals. These reference signals are formed by: additively combining the incoming DPSK signal (0°) with the 90° phase shifted signal to generate ±45° signals, and additively combining pairs of these signals to generate the ±22½° and ±67½° signals. It is noted that "additively combining" includes the subtraction operation.

In yet another embodiment of this invention a microprocessor advantageously performs the above-mentioned tasks in a digital manner utilizing periodic samples of the incoming DPSK signal.

The foregoing and other objects and features of this invention will be more fully understood from the following description of the illustrative embodiments thereof in conjunction with the accompanying drawings.

DETAILED DESCRIPTION

Figure 1:
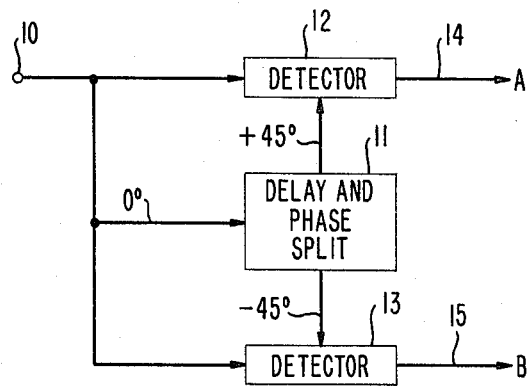
FIG. 1 discloses in block form a prior art DPSK demodulator.

The prior art circuit of FIG. 1 illustrates differential phase detection of a received 4-phase signal having phase changes of 0°, ±90°, and 180°. The received signal enters the demodulator on lead 10 and is simultaneously fed to detector circuits 12, 13 and to Delay and Phase Shift circuit 11. It is necessary to delay the incoming signal when differential phase modulation is used because the transmitted information resides in the phase difference between adjacent intervals. The delay must be equal in magnitude to 1 band interval. If, for example, data transmission proceeds at a baud rate of 1/T symbols per second, then the required delay is T seconds. Detection is therefore a matter of measuring the phase difference between successive symbols of the incoming signal. This measurement is generally accomplished by use of well known correlation techniques such as by multiplying together the signals to be correlated. In a larger sense correlation includes the operations of amplitude scaling, delaying one of the signals to be multiplied, low pass filtering and threshold detection. The magnitude and polarity of the multiplication products determine the phase shift of the received signal.

When the signals to be correlated are carefully chosen, the magnitude measurement can be eliminated and detection then becomes a matter of polarity detection alone. Delay and Phase Split circuit 11 generates a pair of reference signals, one having a ±45° phase shift and the other having a −45° phase shift with respect to the incoming signal. Such a choice of reference signals leads to a simple polarity detection. The outputs of detectors 12, 13 (designated A, B) appear on leads 14 and 15 respectively. The joint polarity of output signals A and B uniquely determine the received binary digit pair (dibit). The following table illustrates the decoding process:

| BIT PAIR | PHASE CHANGE | A | B |
|---|---|---|---|
| 11 | 0° | + | + |
| 10 | 90° | + | − |
| 00 | 180° | − | − |
| 01 | −90° | − | + |

Figure 2:
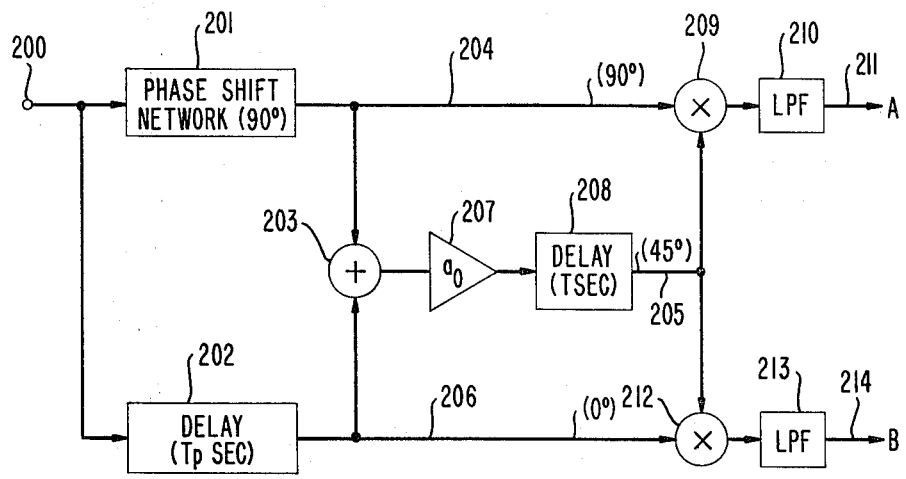
FIG. 2 discloses a 4-phase DPSK demodulator that embodies the invention.

The instant invention is embodied in the diagram of FIG. 2 which is shown in greater detail than the prior art circuit of FIG. 1. The incoming phase modulated signal appears on input lead 200. For the purposes of illustration a 4-phase signal is assumed. Phase shift network 201 is shown providing 90° of phase shift at the carrier frequency of the incoming phase modulated signal. A conventional filter providing 90° of phase shift at the carrier frequency and linear phase in that region would be acceptable. Associated with any real filter is a propagation delay ($T_p$) which must be compensated so that correlation proceeds between adjacent symbols. Delay network 202 of FIG. 2 compensats the delay of network 201 by providing $T_p$ seconds of delay. The net effect of networks 201 and 202 is that the signals emerging from each will be identical except for a 90° phase difference. These signals are combined in adder 203 to form a signal having a 45° relative phase shift with respect to each of the signals being combined. For convenience, these three signals will hereinafter be referred to as the 0° signal (line 206), the 90° signal (line 204) and the 45° signal (line 205).

The 45° signal has been formed by the addition of two equal amplitude sine waves that are 90° out of phase and is itself a sinusoid; however, its amplitude has been increased by a factor of $\sqrt{2}$ over that of either input wave. Gain control 207 having a gain of $a_0$ is used to regulate the amplitude of the 45° signal so that the multiplication step to be performed in devices 209 and 212 is between equal amplitude signals. Here $a_0$ is chosen to be $1/\sqrt{2}$.

Delay network 208 provides T seconds (1 baud interval) of delay so that correlation can take place between adjacent symbols. This delayed signal is multiplied in circuit 209 with the non-delayed 90° signal and multiplified in circuit 212 with the non-delayed 0° signal. The multiplication products, smoothed by low pass filters 210 and 213 are available on outputs 211 and 214. They are designated A and B respectively. The polarities of the A and B output signals uniquely determine the phase shifts of the incoming signal on lead 200. The above table may be used to decode the polarities of A and B.

In one view of the invention it may be observed that the prior art dual phase shift requirement has been avoided by rotating the DPSK signal constellation by 45° and utilizing a single 90° phase shift network such as was used in detecting the 4-phase constellation that did not transmit the 0° vector. The 45° rotation is achieved by simple addition after a 90° phase shift operaton has been performed. Alternatively, the 45° rotation may be viewed as changing the received signal constellation from (0°, ±90°, 180°) to (±45°, ±135°). Detection of the latter constellation only requires that a 90° reference signal be generated. Regardless of how the invention is perceived, its advantages become manifest in a sampled data system as will be discussed, infra, in connection with FIG. 4.

Figure 3:
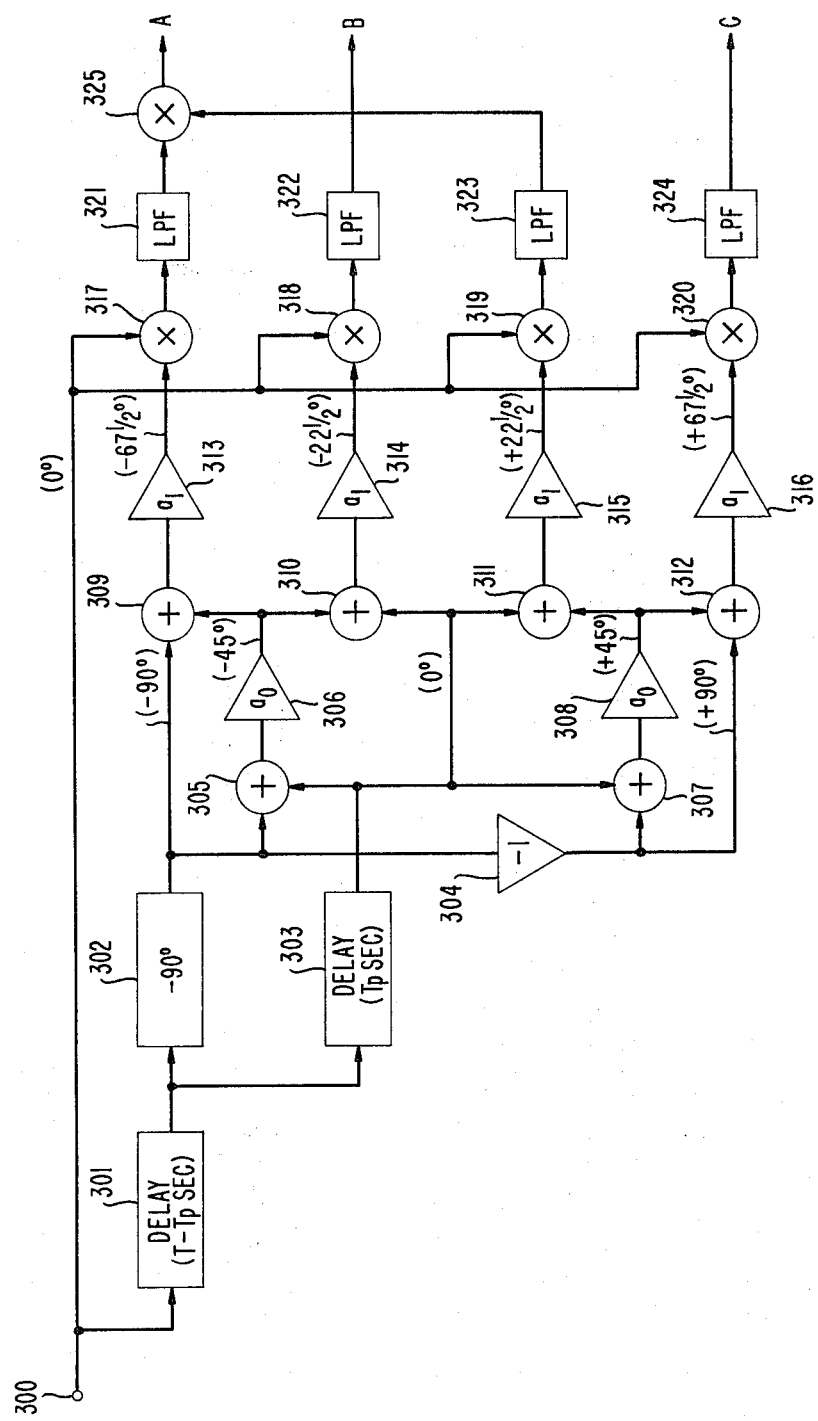
FIG. 3 disclosed an 8-phase DPSK demodulator in accordance with the invention.

The invention is, of course, not limited to the 4-phase embodiment as disclosed in FIG. 2 but extends generally to multiphase PSK systems. FIG. 3 illustrates an 8-phase DPSK system and represents a natural extension of the inventive concept. The incoming DPSK signal appears on lead 300 where it is fed to multipliers 317–320 for later correlation with reference signals to be generated by compenents 301–316. Correlation takes place between delayed and non-delayed signals, here a choice is made to delay the reference signals although the incoming DPSK signal itself could as easily have been delayed. Delay circuit 301 is arranged to provide a net delay of T seconds. Since an additional propagation delay ($T_p$) is encountered in phase shift network 302, the delay needed in circuit 301 is reduced. Delay network 303 is used to compensate the delay of Phase Shift network 302.

Adder 305 combines the incoming DPSK signal with the −90° phase shifted version of the incoming signal to generate a −45° phase shifted signal. The −45° signal is amplitude sealed in circuit 306 where $a_0=1/\sqrt{2}$ since the addition of two sine waves, 90° out of phase, increases the magnitude of the newly formed sine wave by a factor of $\sqrt{2}$. In a similar manner, a +90° phase shifted signal is created through inverting amplifier 304 and is thereafter combined with the incoming DPSK signal in adder 307 to generate a +45° phase shifted signal which is also sealed by factor $a_0$ in circuit 308. Circuits 209–312 additively combine inputs having 45° phase differences to generate reference signals having relative phases of $\pm 67\frac{1}{2}°$ and $\pm 22\frac{1}{2}°$ with respect to the incoming DPSK signal. Combining sine waves having a 45° phase difference increases the resulting sine wave amplitude by a factor of $\sqrt{2(1+\cos 45°)}$. Accordingly, circuits 313–316 scale the amplitude of their respective inputs by a factor of $1/\sqrt{2(1+\cos 45°)}$.

Multipliers 317–320 correlate the incoming DPSK signal with the generated reference signals. The products of multiplication are smoothed in low pass filters 321–324 to remove high frequency energy and pass only the slowly varying positive and negative polarities representing the data.

The outputs of low pass filters 321 and 323 are further correlated in multiplier 325 to reduce the number of signals used in decoding the 8-phase signal. The polarities of signals designated A, B and C are decoded according to the following table:

| PHASE SHIFT | A | B | C |
|---|---|---|---|
| 0° | + | + | + |
| +45° | − | + | + |
| +90° | − | − | + |
| +135° | + | − | + |
| 180° | + | − | − |
| −135° | − | − | − |
| −90° | − | + | − |

| PHASE SHIFT | A | B | C |
| --- | --- | --- | --- |
| −45° | + | + | − |

Figure 4:
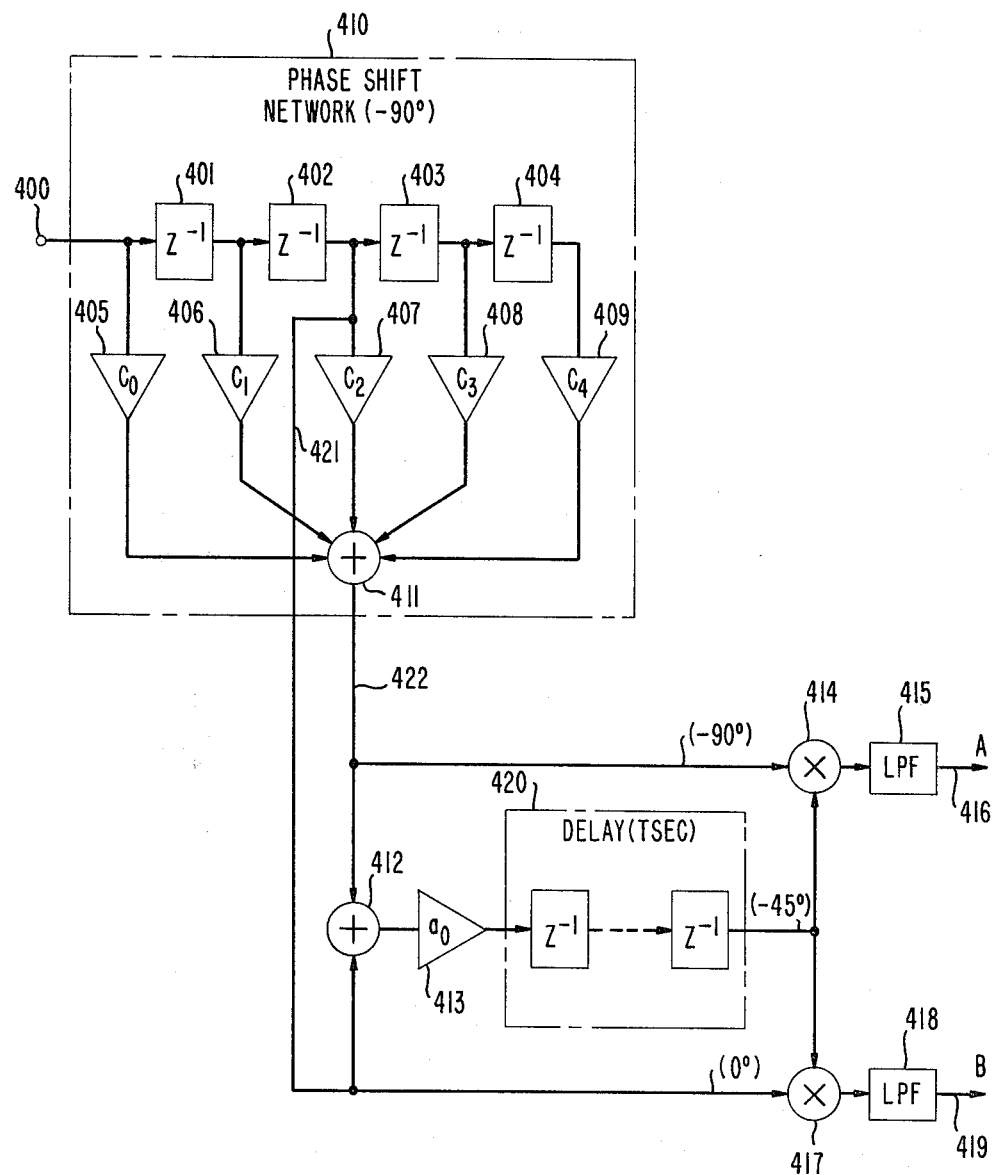
FIG. 4 illustrates an embodiment of the invention adapted to digital signal processing of 4-phase DPSK signals.

FIG. 4 provides greater detail in implementing the 4-phase DPSK detector in a manner applicable to a sampled data environment. The incoming DPSK signal enters the detector on lead 400 where it is fed to a finite impulse response Hilbert filter 410. Devices 401–404 are each designated $Z^{-1}$ representing a Z-transformation. More particularly, each device indicates a delay of one sample interval. In the example of FIG. 4 a sampling rate of 7200 samples per second is used. The individual samples are amplitude scaled by devices 405–409 in a manner such that when combined in adder 411 a 90° phase shift of the incoming signal is present on line 422. The propagation delay ($T_p$) between input and output signals is readily compensated in the implementation of filer 410. Here the input signal is available at variously delayed times vis-à-vis the output signal. Advantageousely, the coefficients $c_0$–$c_4$ are selected to provide an output signal (shown on line 422) that is 90° phase shifted with respect to the input signal (shown on line 421) simultaneous therewith. Compensation for propagation delay, such as was required in connection with FIGS. 2 and 3, is no longer needed.

For simplicity, a Hilbert filter having only 5 taps is illustrated. The coefficients in this case where a 90° phase shift is required and 7200 samples per second it utilized are: $c_0 = c_2 = c_4 = 0$, $c_1 = 0.66667$, and $c_3 = -0.66667$. In this case the filter characteristic contains a certain amount of ripple. Increases in the number of taps on the Hilbert filter improve performance by reducing ripple. One good choice is to select an 11 tap Hilbert filter having coefficients given by: $c_1 = c_3 = c_5 = c_7 = c_9 = 0$, $c_0 = -0.0397986$, $c_2 = -0.144556$, $c_4 = -0.611133$, $c_6 = 0.611133$, $c_8 = 0.144556$, and $c_{10} = 0.0397986$. Other selections are, of course, possible and are taught in Chapter 3 of the book *Theory and Application of Digital Signal Processing*, Prentice-Hall, Inc., 1975, by Rabiner, L. R. and Gold, B.

A 45° phase shifted signal is generated by combining the 0° signal from line 421 with the 90° signal from line 422 in adder 412. The 45° signal thus formed is scaled by device 413 having gain $a_0 = 1/\sqrt{2}$. A 1 baud delay interval (T seconds) is provided by device 420 shown to be a plurality of successive sample periods. When a sampling rate of 7200 samples per second is selected together with a baud rate of 1200 symbols per second there are exactly six samples per baud interval; therefore six devices labeled $Z^{-1}$ are contained in device 420 for this example case.

Multipliers 414 and 417 provide the necessary multiplication between delayed and non-delayed signals. The joint polarity of products designated A,B—on lines 416 and 419 respectively—determine the phase shifts of the incoming DPSK signal as in the above discussed embodiment of FIG. 2.

Figure 5:
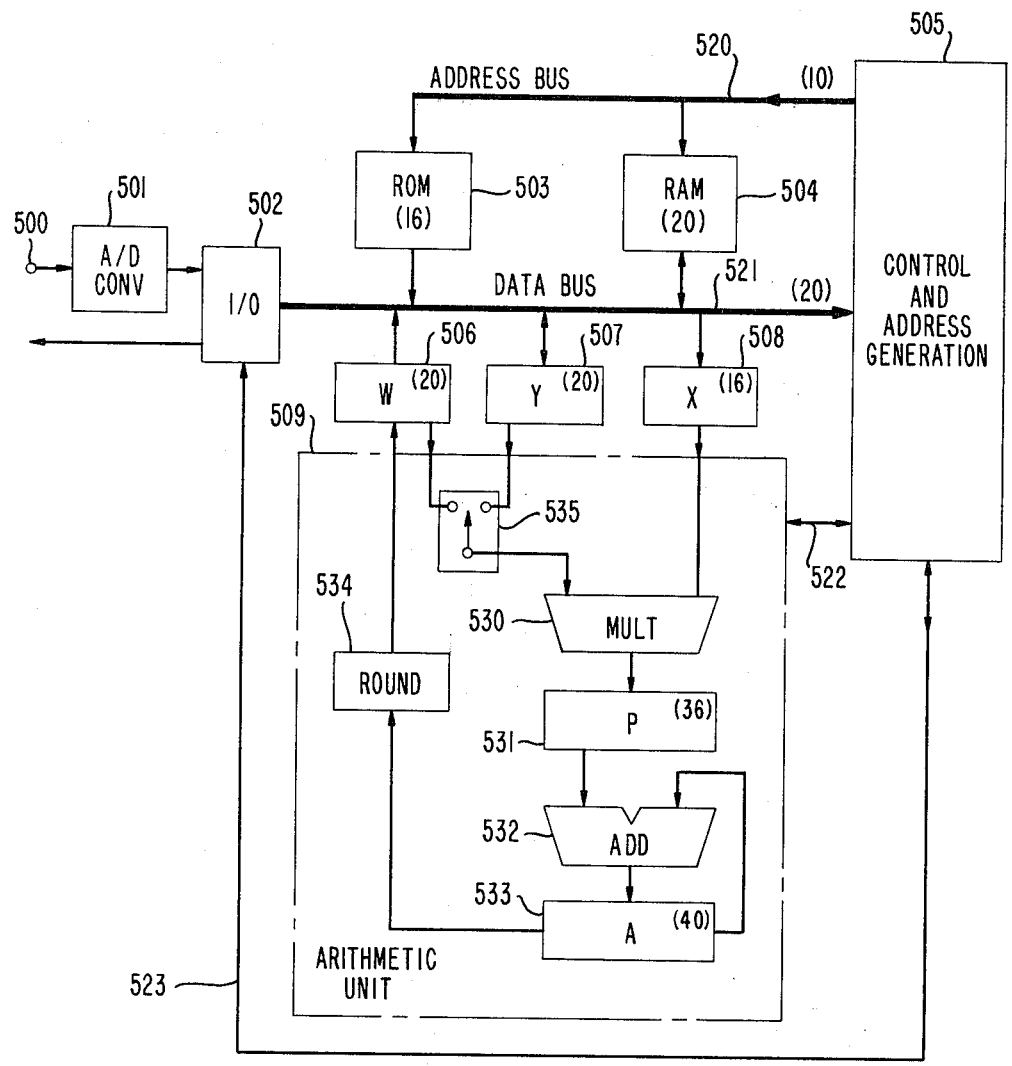
FIG. 5 discloses a digital signal processor adapted to process a sampled data signal in accordance with the invention.

The FIG. 4 embodiment of the invention may be implemented by a microprocessor such as disclosed in FIG. 5. In this implementation digital processing is shown in block diagram form. Detailed circuits are not set forth because the detail is considerable, not directly relevant to the invention, and believed to be well within the knowledge of persons having ordinary skill in the art of processor design. Further, a plurality of microprocessors are commercially available in different architectures that can accomplish the relatively simple computations required to implement the invention with very different details. A general description of the required operations is set forth in the following steps:

1. Sample the incoming signal at time $T_n$ and convert the sample (voltage level) into a binary signal—16 digit resolution is adequate.
2. Shift the information stored in Random Access Memory (RAM) location $D_n$ to location $D_{n+1}$ for $n = 3,2,1,0$.
3. Store the binary signal in location $D_0$ of the RAM.
4. Multiply the contents of RAM of locations $D_n$ by coefficients $c_n$ (stored in the Read Only Memory) for $n = 0,1,2,3,4$. Add the five products indicated and store the result at RAM location M.
5. Shift the contents of memory location $S_n$ to $S_{n+1}$ for $n = 4,3,2,1,0$.
6. Add the contents of RAM location M to the contents of RAM location $D_2$ and store the result in RAM location $S_0$.
7. Multiply the contents of RAM location $S_5$ and RAM location M to form product A. This product is shown on line 417 of FIG. 4.
8. Multiply the contents of RAM location $S_5$ with the contents of RAM location $D_2$ to form the product B. This product is shown on line 418 of FIG. 4.

Products A and B may at this time be filtered either by conventional analog means or by digital techniques implemented by a microprocessor such as shown in FIG. 5. The polarity of filtered products A and may be used to decode phase changes of the incoming signal.

Returning to the diagram of FIG. 5, Analog to Digital converter 501 samples the incoming signal at a rate set by a predetermined clock signal. An example of a converter suitable for this purpose is disclosed in U.S. Pat. No. 4,200,863 which utilizes charge redistribution techniques to achieve A/D conversion. The incoming signal, thus encoded into binary digital form, is temporarily stored in Input/Output Buffer 502 until Control Unit 505 gates the stored data onto Data Bus 521 where it is transferred to Random Access Memory (RAM) 504 for later processing. RAM 504 is adapted to both read the contents of Data Bus 521 as well as write information onto it. The memory location in RAM 504 being exercised is selected by addressing data present on Address Bus 520. RAM 504 stores 20-bit words including sampled signal data and intermediate computational results.

Read Only Memory (ROM) 503 contains a plurality of 16-bit words comprising instructions and constants that may only be read onto Data Bus 521 from an internal memory location selected by addressing data present on Address Bus 520. The aforementioned coefficients $c_0$–$c_4$ are stored in ROM 503 along with pre-programmed instructions for processing the input data in accordance with the invention.

Control Unit 505 is responsive to instructions from ROM 503 and converts these instructions in specific sequence for operations such as the determination as to which signals will be transferred between the various processing blocks shown in FIG. 5. Control Unit 505 sets up the various paths and assures that Data Bus 521 will not have more than a single source writing onto it at any one time.

Control Unit 505 generates the address destinations that define where in memory units 503 and 504 a particular word is to be stored or retrieved. Control Unit 505 also has the capability for arithmetic operations so that memory address modifications may be achieved simultaneous with, but without burden to, Arithmetic Unit 509.

X Register 508 and Y Register 507 contain inputs for Arithmetic Unit 509. Coefficients $c_0$–$c_4$ are transmitted to Arithmetic Unit 509 through the X Register, and stored samples are transmitted through the Y Register. The W Register 506 contains the output of the Arithmetic Unit. The contents of W can be sent to Input/Output Register 502, stored in RAM 504, or returned to Arithmetic Unit 509 for use in the next calculation.

Arithmetic Unit 509 performs the mutiplications and additions required to evaluate the computations set forth in the diagram of FIG. 4. Each multiplication by multiplier 530 is placed on completion in P (Product) Register 531. Successive products may be added together by adder 532 and the result accumulated in A (Accumuator) Register 533. The product of the contents of the 16-bit X Register and the 20-bit Y or W Register produces up to 36 bits in the P Register. Accumulating these products may generate some "carries", so 40 bits are provided in the accumulator. When the accumulation is complete the contents of A Register 533 are transmitted to output W Register 506. Since W accommodates only 20 bits, the contents of the accumulator are rounded off in Unit 534 to make them fit into W. A transfer of data from A to W in the simplest case results in a truncation, that is, a portion of the 40 bit contents of the A Register are simply dropped off. Other methods of rounding and truncation are clearly possible.

Switch 535 permits the contents of either Register W or Register Y to be selected as one of the inputs of multiplier 530. This switch, as well as the other Arithmetic Unit functions, are controlled by signals over line 522 from Control Unit 505.

The specific digital signal processor shown in FIG. 5 is, in fact, a general purpose device adapted to perform the specific computations required by the invention. It may further be programmed to perform a number of filtering functions such as low pass filtering as needed in the next step of demodulation. The most favorable manner in which to implement the invention is clearly determined by the environment in which the invention will function. The simple calculations required, make the invention easily adaptable to numerous hardware or software implementations. Therefore, variations of the specific embodiment are possible within the spirit and scope of the invention.

What is claimed is:

1. A receiver for differential phase shift keyed (DPSK) signals having a baud rate of 1/T symbols per second, wherein products are formed between signals of T second differential delay and wherein polarities of said products decode the phase shifts of the received DPSK signal, including means for phase shifting the received DPSK signal by substantially 90°, characterized by:
   means for additively combining the 90° phase shifted signal and the received DPSK signal to generate a 45° phase shifted signal;
   means responsive to the 45° phase shifted signal and to the 90° phase shifted signal for forming a first product therebetween; and
   means responsive to the 45° phase shifted signal and to the received DPSK signal for forming a second product therebetween.

2. The receiver according to claim 1 further including means for delaying the 45° phase shifted signal by substantially T seconds; and
   means for delaying the incoming DPSK signal by Tp seconds prior to additive combination with the 90° phase shifted signal where Tp is the propagation delay associated with the 90° phase shifting means.

3. The receiver according to claim 1 further including means for periodically sampling amplitude levels of the received DPSK signal;
   means for storing samples of said DPSK signal; and
   means for additively combining portions of a plurality of said samples to form the 90° phase shifted signal.

4. Apparatus for generating reference signals in a receiver for differential phase shift keyed (DPSK) signals wherein products are formed between signals of T second differential delay including,
   means responsive to the incoming DPSK signal for phase shifting same by 90° to form a 90° reference signal;
   means for additively combining the incoming DPSK signal and the 90° reference signal to generate a 45° reference signal, and
   means for correlating the 45° reference signal with said DPSK signal and said 90° reference signal.

5. Apparatus according to claim 4 further including means for additively combining pairs of signals including the incoming DPSK signal, the 90° reference signal and the 45° reference signal to generate additional reference signals whereby incoming DPSK signals having more than four discrete phase states may be demodulated.

6. A receiver for demodulating a differential phase shift keyed (DPSK) signal having phase changes every T seconds wherein products are formed between signals of T second differential delay and polarities of said products uniquely determine phase shifts of the DPSK signal, including means for phase shifting the DPSK signal by 90°,
   characterized by:
   means for additively combining the DPSK signal and the 90° phase shifted signal to form a 45° phase shifted signals;
   means for delaying said 45° phase shifted signal by T seconds;
   means responsive to said DPSK signal and to said 45° phase shifted signal for forming a first product therebetween; and
   means responsive to the 90° phase shifted signal and to the 45° phase shifted signal for forming a second product therebetween.

7. A method for demodulating a 4-phase differential phase shift keyed (DPSK) signal having a baud rate of 1/T symbols per second including the steps of
   phase shifting the DPSK signal by substantially 90°;
   additively combining the DPSK signal with the 90° phase shifted signal to form a 45° phase shifted signal;
   delaying the 45° phase shifted signal by T seconds; and
   correlating the delayed 45° phase shifted signal with said DPSK signal and said 90° phase shifted signal.

8. The method according to claim 7 wherein correlation includes the steps of
   multiplying the signals to be correlated to form products therebetween; and
   filtering the individual products of said multiplication to extract the polarity of said products.

* * * * *